(12) United States Patent
Dumont et al.

(10) Patent No.: US 7,198,854 B2
(45) Date of Patent: Apr. 3, 2007

(54) SILICONE COMPOSITION USEFUL ESPECIALLY FOR THE PRODUCTION OF ANTI-FRICTION VARNISH, PROCESS FOR THE APPLICATION OF SAID VARNISH TO A SUBSTRATE, AND TREATED SUBSTRATE

(75) Inventors: Laurent Dumont, La Motte Servolex (FR); Alain Pouchelon, Meyzieu (FR); Marilyne Quemin, Lyons (FR)

(73) Assignee: Rhodia Chimie, Boulogne-Billancourt (FR)

( * ) Notice: Subject to any disclaimer, the term of this patent is extended or adjusted under 35 U.S.C. 154(b) by 0 days.

(21) Appl. No.: 10/518,342

(22) PCT Filed: Jun. 17, 2003

(86) PCT No.: PCT/FR03/01833

§ 371 (c)(1),
(2), (4) Date: Sep. 30, 2005

(87) PCT Pub. No.: WO03/106564

PCT Pub. Date: Dec. 24, 2003

(65) Prior Publication Data

US 2006/0084753 A1 Apr. 20, 2006

(30) Foreign Application Priority Data

Jun. 18, 2002 (FR) .................... 02 07489

(51) Int. Cl.
*C08L 83/04* (2006.01)
(52) U.S. Cl. .............. 428/447; 525/431; 525/474; 525/477; 525/479; 524/492; 524/493; 252/8.61; 252/8.63; 528/15; 528/31; 528/32
(58) Field of Classification Search .............. None
See application file for complete search history.

(56) References Cited

U.S. PATENT DOCUMENTS

| | | | |
|---|---|---|---|
| 4,163,082 A | 7/1979 | Romenesko | 428/447 |
| 4,508,606 A | 4/1985 | Andrade et al. | 204/169 |
| 4,791,029 A | 12/1988 | Fau et al. | 428/447 |
| 4,874,671 A | 10/1989 | Tahara et al. | 428/447 |
| 5,147,397 A | 9/1992 | Christ et al. | 623/6 |
| 5,364,662 A | 11/1994 | Domenico et al. | 427/536 |
| 5,506,302 A | 4/1996 | Shiono et al. | 524/731 |
| 5,827,921 A | 10/1998 | Osawa et al. | 524/837 |
| 5,998,536 A | 12/1999 | Bertry et al. | 524/557 |
| 6,265,690 B1 | 7/2001 | Förnsel et al. | 219/121.5 |
| 6,354,620 B1 * | 3/2002 | Budden et al. | 280/728.1 |
| 6,465,552 B1 | 10/2002 | Chorvath et al. | 524/323 |
| 2002/0012756 A1 | 1/2002 | Kuchertz et al. | 427/569 |
| 2002/0061365 A1 | 5/2002 | Grape et al. | 427/387 |
| 2002/0086937 A1 | 7/2002 | Chorvath et al. | 524/719 |

FOREIGN PATENT DOCUMENTS

| | | |
|---|---|---|
| DE | 199 46 252 | 4/2001 |
| EP | 0 431 979 | 6/1991 |
| EP | 0 647 477 | 4/1995 |
| EP | 0 702 068 | 3/1996 |
| EP | 0 712 956 | 5/1996 |
| EP | 0 819 735 | 1/1998 |
| EP | 0 659 857 | 4/1998 |
| EP | 0 866 164 | 9/1998 |
| EP | 0 643 106 | 12/1999 |
| EP | 1 078 823 | 2/2001 |
| FR | 2 617 760 | 1/1989 |
| GB | 2 045 824 | 11/1980 |
| JP | 03-122185 | 5/1991 |
| JP | 10-025698 | 1/1998 |
| WO | WO 95/19394 | 7/1995 |
| WO | WO 01/78891 | 10/2001 |

* cited by examiner

*Primary Examiner*—Marc S. Zimmer
(74) *Attorney, Agent, or Firm*—James C. Lydon

(57) ABSTRACT

A silicone composition useful especially for the production of varnishes applicable to substrates whose coefficient of friction it is sought to reduce. The object is to provide an anti-friction silicone varnish for textiles coated with silicone elastomers which is economic and adhesive, provides the desired slip, resists soiling and is shiny. This object is achieved by a crosslinkable silicone composition containing two silicones A and B which react with one another in the presence of a catalyst C to allow crosslinking, and a particulate component D selected from the group comprising powdered (co)polyamides—preferably (co)polyamides 6, 12 and 6/12. The (co)polyamide particles are of substantially rounded shape and the mean particle diameter $\Phi_{md}$ is between 0.1 and 200 µm, preferably between 5 and 100 µm and particularly preferably between 10 and 50 µm. Also disclosed is a varnishing process and a composite containing the varnished substrate.

18 Claims, No Drawings

SILICONE COMPOSITION USEFUL ESPECIALLY FOR THE PRODUCTION OF ANTI-FRICTION VARNISH, PROCESS FOR THE APPLICATION OF SAID VARNISH TO A SUBSTRATE, AND TREATED SUBSTRATE

The invention relates to the general field of polymer coatings or varnishes capable of imparting anti-friction properties to substrates.

More precisely, the invention relates to silicone compositions useful especially for the production of varnishes applicable to substrates whose coefficient of friction it is sought to reduce. The substrates in question are of diverse types and can consist especially of:
- woven or non-woven fibrous substrates coated with at least one layer for protection or mechanical strengthening, based on a coating polymer, for example of the silicone elastomer type;
- polymer or elastomer substrates, particularly plastic films, such as heat transfer ribbons which can be used especially as ink substrates in heat transfer printers; or protective packaging films.

The present invention further relates to the processes for the application of the anti-friction varnish in question to different substrates.

Finally, the invention relates to the substrates coated with such anti-friction varnishes, particularly:
- textile cloths coated with a layer of elastomer to which the anti-friction varnish is applied, such cloths being useful for the manufacture of elements of textile architecture, furnishing fabrics or cushions for the individual protection of vehicle occupants, also called airbags;
- heat transfer ribbons consisting e.g. of plastic films (for example made of polyester) that carry ink and can be used in heat transfer printers;
- protective packaging films;
- massive parts made of silicone elastomers.

The general problem on which the invention is based is the development of an anti-friction silicone varnish. The problem of reducing coefficients of friction is particularly acute in the case of substrates that have crosslinked silicone elastomer coatings. In fact, it is well known to those skilled in the art that silicone elastomer coating layers often have a sticky feel, which is disadvantageous for numerous applications, particularly airbags; these are inflatable cushions for the individual protection of vehicle occupants and are produced from a synthetic fiber cloth, for example made of polyamide (Nylon®), coated on at least one side with a layer of an elastomer which can be a silicone elastomer that crosslinks or vulcanizes in the cold by polyaddition (EVF-II) or polycondensation (EVF-I), a silicone elastomer that crosslinks or vulcanizes under the action of heat by polycondensation with peroxide or by polyaddition (EVC), or a viscous silicone elastomer of the LSR type that crosslinks or vulcanizes by polyaddition.

This search for a low coefficient of friction for coatings for flexible substrates—for example woven or non-woven fibrous substrates—whether or not coated with silicone elastomer, is also a concern in other applications, for example fabrics coated with silicone elastomers that are useful especially in textile architecture or in furnishing fabrics, inter alia.

Silicone elastomer coatings on textile substrates have numerous advantages associated with the intrinsic characteristics of silicones. The composites produced possess a good flexibility coupled with a good mechanical strength; furthermore, in contrast to traditional elastomers, silicones give said substrates an increased heat resistance and a long service life, among other things.

This preoccupation with surface slip also concerns coatings for heat transfer ribbons (e.g. made of polyester) or protective packaging films (e.g. made of polyethylene or polypropylene).

Heat transfer ribbons can be used in heat transfer printers. These heat transfer ribbons are very thin (a few microns) and are coated on one side with a layer of ink (waxes or resins) and on the other side with a protective coating. The protective coating used is generally very thin, with a thickness of between 0.1 and 1 micrometer, for protecting the surface of the film and improving the impact of the print head without deforming the transfer of the ink to the applied substrate.

In printers with a printing speed of between 150 and 300 mm/s, it is very important that, when it strikes the protective coating of the ribbon, the print head (flat or wedge-shaped) can slide over the surface of the coating at a high temperature of between 100 and 200° C.

As regards protective packaging films, provision is sometimes made to apply a silicone-based overvarnish thereto in order to give them anti-adhesive properties. However, this overvarnish should have a slip at least equivalent to that of the initial (printed or unprinted) plastic film.

In all the cases cited above by way of illustration, the composites suffer from a lack of slip, which can be associated with the mechanical and surface properties (excessively high coefficient of friction) of silicones.

In the case of textile applications, this disadvantage manifests itself in practice by a low mobility of the coated fabrics on the making tables, compromising their productivity. More specifically, in the case of airbags, deployment can be very detrimentally retarded when the airbag is triggered.

Various types of treatment can be envisaged to surmount this difficulty. Nevertheless, the compromise between surface slip and use properties is such that varnishing seems to be one of the most suitable means of achieving this objective.

PCT application WO-A-00/59992 describes silicone compositions that are useful especially for the production of varnishes applicable to substrates whose coefficient of friction it is sought to reduce. One of these compositions comprises at least one polyorganosiloxane A (POS) crosslinkable via crosslinking functional groups (CFG) by a cationic and/or free radical process, and an initiator C selected from onium borates, characterized in that it also contains POS molecules D substituted by secondary functional groups (SFG) carried by silicon atoms and selected from those comprising at least one alkoxy and/or epoxy and/or carboxyl unit, and optionally a filler (e.g. silica).

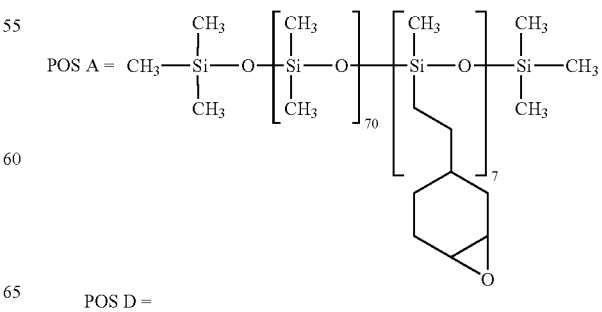

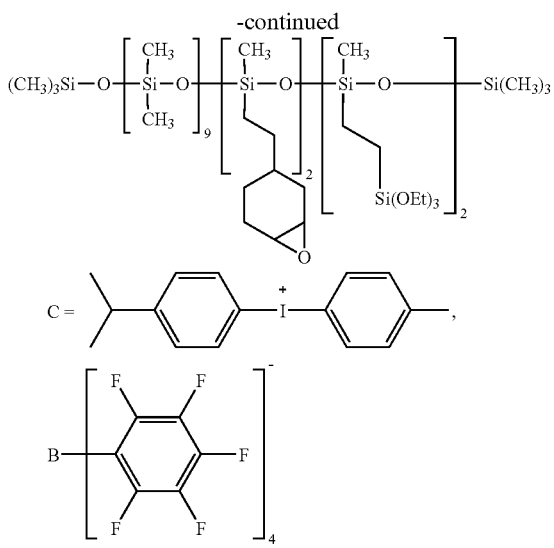

These compositions can also contain fillers and particularly siliceous fillers, which can be e.g. combustion silicas treated with hexamethyldisilazanes or octa-methylcyclotetrasiloxane (specific surface area up to about 300 m²/g), fumed silicas, ground synthetic or natural (polymer) fibers, calcium carbonates, talcum, clays, titanium dioxides, etc.

Such compositions are used as anti-friction varnishes for RTV silicone coatings for airbag fabrics, heat transfer ribbons or packaging films.

Such varnishes remain capable of improvement in terms of their coefficient of sliding friction. Also, they require the use of particular silicones crosslinkable by a cationic process under UV activation, which allows a margin of improvement from the economic point of view and from the point of view of simplification of the means employed.

Patent WO 01/12895 claims the use of platelet fillers in coatings for reducing their coefficient of friction. The varnish is applied at a rate of at most 15 g/m². The fillers cited are optional. They are of two types: reinforcing (maximum 3% w/w, preferably none: precipitated or fumed silicas) and non-reinforcing. Laminar non-reinforcing fillers can be, inter alia, mica, talcum, graphite, vermiculite, smectites, pyrophillite, quartz, zeolites, clays, etc.

A composition given as an example has the following simplified formulation:
  34 parts of α,ω-vinylated PDMS oil of viscosity 20 mPa.s,
  20 parts of diMe ViMe siloxane oil containing 2.5% of Vi,
  11 parts of polymethylhydrogenosiloxane,
  35 parts of talcum,
  platinum catalyst+regulator.

The amounts of non-reinforcing fillers used are very substantial, being in the order of 35–40% w/w. Such a loading can only perturb the mechanical qualities and use properties of the composites containing this silicone varnish according to the prior art. The best results obtained in terms of the coefficient of friction are 0.46 on glass with a non-reinforcing filler consisting of trihydrated aluminum. This obviously needs to be improved.

It is apparent from said prior art that the known silicone varnishes are capable of improvement and that the fillers cited as being able to form part of their composition are very numerous and varied. Moreover, these fillers are present in large amounts, which can prove very troublesome.

Under these circumstances, one of the essential objects of the present invention is to provide an anti-friction silicone varnish for various substrates, especially textile substrates coated with silicone elastomers, said varnish having the qualities of being economic, of being perfectly bonded to the substrate and particularly the layer of coated elastomer, of providing the desired surface slip, and of having a good resistance to soiling as well as a shiny appearance.

Another essential object of the present invention is to provide an anti-friction varnish that can easily be applied to various types of substrate.

Another essential object of the invention is to provide a crosslinkable anti-friction varnish that is easy to use and economic.

Another essential object of the present invention is to provide a silicone composition that is useful especially for the production of anti-friction varnish, said composition having a reasonable cost price and being simple to prepare.

Another essential object of the invention is to provide an anti-friction varnish consisting of a crosslinkable silicone composition that is capable of significantly reducing the coefficient of friction of various types of coated or uncoated substrate.

Another object of the invention is to provide a simple and economic process for the varnishing of different substrates formed e.g. of woven or non-woven fibrous substrates and optionally coated e.g. with a layer of crosslinked silicone elastomer, using an anti-friction varnish based on a silicone composition.

Another essential object of the invention is to provide a composite comprising a substrate optionally coated with at least one layer of elastomer and covered with a silicone varnish as defined above, for example a cloth coated with crosslinked silicone elastomer having a high surface slip.

Another essential object of the invention is to propose a fibrous substrate, for example a fabric, coated with crosslinked elastomer having a coefficient of static friction (Ks) of $\leq 1$ for a deposit D of <25 g/m², corresponding e.g. to the force necessary to initiate the displacement of a rectangular mass, covered with the fabric in question, on a flat glass substrate.

These and other objects are achieved by the present invention, which relates first and foremost to a crosslinkable silicone composition useful especially as a varnish which in particular has anti-friction properties, said composition being of the type comprising on the one hand at least two organosilicon species A and B which react with one another in the presence of a catalyst C to allow crosslinking, at least one of these two species consisting of a polyorganosiloxane (POS), and on the other hand at least one particulate component D, characterized in that:
  this composition is of the type crosslinkable by polyaddition;
  the particulate component D is selected from the group comprising powdered (co)polyamides—preferably (co)polyamides 6, 12 and 6/12—defined as follows:
    the particles are of substantially rounded shape, and
    the mean particle diameter $\Phi_{md}$ is between 0.1 and 200 μm, preferably between 5 and 100 μm and particularly preferably between 10 and 50 μm;
  it also contains at least one other particulate component E selected from the group comprising powdered silicas having a mean particle diameter $\Phi_{md}$ of about 0.1 μm or less, and a BET specific surface area greater than 50 m²/g, preferably of between 50 and 400 m²/g and especially of between 150 and 350 m²/g.

The silicone varnish according to the invention is advantageous in that it makes it possible very greatly to reduce the coefficient of friction and subsequently to give a more slippery feel, while at the same time having a shiny appearance and a very good resistance to soiling.

The mechanical qualities and use properties of the substrates varnished with the composition according to the invention are not affected.

In addition, this varnish composition is stable.

It is to the inventors' credit to have selected a specific particulate component from among the huge number of particulate fillers commonly cited as possible constituents of silicone varnishes. In fact, it could not in any way have been predicted that this carefully selected particulate component would be capable of achieving all the advantageous results mentioned above.

According to the invention, preference may be given to powdered (co)polyamides with a density of between 1 and 1.2 g/cm$^3$.

According to one preferred characteristic of the invention, the particulate component D is present in an amount of 0.1 to 20% w/w, based on the total weight of the varnish composition.

This limited amount conveys the fact that this component cannot be likened to a filler that influences the mechanical qualities and use properties of the varnished substrate.

This particulate component E is present in an amount of 0.001 to 5% w/w, based on the total weight of the composition.

The preferred varnish composition is crosslinkable by polyaddition and comprises:

(A) 100 parts by weight of at least one polyorganosiloxane (POS) having at least two alkenyl groups, preferably $C_2$–$C_6$ alkenyl groups, bonded to the silicon in each molecule;
(B) 1 to 50 parts by weight of at least one polyorganosiloxane having at least three hydrogen atoms bonded to the silicon in each molecule;
(C) 0.001 to 1 part by weight of at least one catalyst preferably composed of at least one metal belonging to the platinum group;
(D) 0.1 to 20 parts by weight of at least one particulate component consisting of (co)polyamide;
(E) 0.001 to 5 parts by weight of at least one siliceous particulate component;
(F) 0 to 30 parts by weight of at least one adhesion promoter;
(G) 0 to 1 part by weight of at least one crosslinking inhibitor;
(H) 0 to 10 parts by weight of at least one polyorganosiloxane resin;
(I) optionally at least one functional additive for imparting specific properties.

The viscosity of the non-crosslinked liquid varnish as applied to the substrate is an important parameter of the invention. Thus the dynamic viscosity η (mPa.s at 25° C.) of the silicone phase of the varnish, consisting of the POS A and B and optionally the components H or I, is such that:

$$200 \leq \eta \leq 3000,$$

preferably $$300 \leq \eta \leq 2000,$$

and particularly preferably between $$400 \leq \eta \leq 900.$$

The dynamic viscosity at 25° C. of all the silicone polymers considered in the present disclosure can be measured with a BROOKFIELD viscometer according to standard AFNOR NFT 76 102 of February 1972.

The viscosity referred to in the present disclosure is the dynamic viscosity at 25° C., or "Newtonian" viscosity, i.e. the dynamic viscosity which is measured, in a manner known per se, at a sufficiently low shear velocity gradient for the measured viscosity to be independent of the velocity gradient.

As regards the detailed nature of the different constituents of the silicone varnish composition according to the invention, it may be specified that the POS A and the optional resins H preferably have siloxy units of the formula $$W_a Z_b SiO_{(4-(a+b))/2} \tag{1}$$

in which:
the symbols W, which are identical or different, are each an alkenyl group and preferably a $C_2$–$C_6$ alkenyl;
the symbols Z, which are identical or different, are each a non-hydrolyzable monovalent hydrocarbon group that is devoid of an unfavorable action on the activity of the catalyst, is optionally halogenated and is preferably selected from alkyl groups having from 1 to 8 carbon atoms inclusive, and from aryl groups;
a is 1 or 2, b is 0, 1 or 2 and a+b is between 1 and 3;
optionally at least some of the other units are units of the empirical formula $$Z_c SiO_{(4-c)/2} \tag{2}$$

in which Z is as defined above and c has a value of between 0 and 3.

A very large majority of the POS A can be formed of units of formula (1), or it can also contain units of formula (2). Likewise, they can have a linear structure. Their degree of polymerization is preferably between 2 and 5000.

Z is generally selected from methyl, ethyl and phenyl radicals, at least 60 mol % of the radicals Z being methyl radicals.

Examples of siloxy units of formula (1) are the vinyldimethylsiloxane unit, the vinylphenylmethylsiloxane unit and the vinylsiloxane unit.

Examples of siloxy units of formula (2) are $SiO_{4/2}$, dimethylsiloxane, methylphenylsiloxane, diphenylsiloxane, methylsiloxane and phenylsiloxane units.

Examples of POS A are dimethylpolysiloxanes with dimethylvinylsilyl ends, methylvinyldimethylpolysiloxane copolymers with trimethylsilyl ends, methylvinyl-dimethylpolysiloxane copolymers with dimethylvinylsilyl ends, and cyclic methyl-vinylpolysiloxanes.

The dynamic viscosity $\eta_d$ of this POS A is between 0.01 and 500 Pa.s and preferably between 0.01 and 300 Pa.s.

Preferably, the POS A comprises at least 98% of siloxy units D: —$R_2SiO_{2/2}$, where R is defined in the same way as Z, this percentage corresponding to the number of units per 100 silicon atoms.

Preferably, the alkenyl units W are vinyls carried by siloxy units D and optionally M and/or T.

The preferred POS B are selected from those comprising siloxy units of the formula $$H_d L_e SiO_{(4-(d+e))/2} \tag{3}$$

in which:
the symbols L, which are identical or different, are each a non-hydrolyzable monovalent hydrocarbon group that is devoid of an unfavorable action on the activity of the catalyst, is optionally halogenated and is preferably selected from alkyl groups having from 1 to 8 carbon atoms inclusive, and from aryl groups;

d is 1 or 2, e is 0, 1 or 2 and d+e has a value of between 1 and 3;

optionally at least some of the other units being units of the empirical formula

 (4)

in which L is as defined above and g has a value of between 0 and 3.

An example of POS B which may be mentioned is poly(dimethylsiloxane)-(methylhydrogenosiloxy)-α,ω-dimethylhydrogenosiloxane.

The POS B can be formed only of units of formula (1) or also contains units of formula (2).

The POS B can have a linear, branched, cyclic or network structure. The degree of polymerization is greater than or equal to 2 and more generally less than 100.

The dynamic viscosity $\eta_d$ of this POS B is between 5 and 1000 mPa.s and preferably between 10 and 500 mPa.s.

The group L is defined in the same way as the group Z above.

Examples of units of formula (1) are $H(CH_3)_2SiO_{1/2}$, $HCH_3SiO_{2/2}$ and $H(C_6H_5)SiO_{2/2}$.

Examples of units of formula (2) are the same as those given above for the units of formula (2).

Examples of POS B are:
dimethylpolysiloxanes with hydrogenodimethylsilyl ends,
copolymers containing dimethylhydrogenomethylpolysiloxane units with trimethylsilyl ends,
copolymers containing dimethylhydrogenomethylpolysiloxane units with hydrogenodimethylsilyl ends,
hydrogenomethylpolysiloxanes with trimethylsilyl ends,
cyclic hydrogenomethylpolysiloxanes,
hydrogenosiloxane resins containing siloxy units M: $R_3SiO_{1/2}$, Q: $SiO_{4/2}$ and/or T: $RSiO_{3/2}$, and optionally D: —$R_2SiO_{2/2}$, where R=H or is defined in the same way as L.

The following may be mentioned as other examples of monovalent hydrocarbon groups Z or L that may be present in the POS A/B referred to above: methyl; ethyl; n-propyl; i-propyl; n-butyl; i-butyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,5,5,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-trifluorotolyl; and xylyls such as 2,3-dimethylphenyl and 3,4-dimethylphenyl.

These groups can optionally be halogenated or they can be selected from cyanoalkyl radicals.

The halogens are e.g. fluorine, chlorine, bromine and iodine, chlorine or fluorine being preferred.

The POS A/B can consist of mixtures of different silicone oils.

These POS A/B can be:
RTV as defined above and in U.S. Pat. Nos. 3,220,972; 3,284,406; 3,436,366; 3,697,473 and 4,340,709;
LSR as defined above;
or EVC as defined above.

Preferably, the alkenyl groups W of the POS A and/or of the optional POS resins H are vinyl groups Vi carried by siloxy units D and optionally M and/or T.

According to the invention, it is perfectly possible to envisage using a mixture of different POS A and different POS B, as defined above (linear and/or cyclic).

The POS resins H, if present, will preferably be selected from those containing at least one alkenyl radical in their structure and having an alkenyl group content of between 0.1 and 20% by weight and preferably of between 0.2 and 10% by weight.

These resins are well-known branched organopolysiloxane oligomers or polymers that are available commercially. They take the form of solutions and preferably siloxane solutions. Their structure contains at least two different units selected from those of the formulae $R'_3SiO_{0.5}$ (unit M), $R'_2SiO$ (unit D), $R'SiO_{1.5}$ (unit T) and $SiO_2$ (unit Q), at least one of these units being a unit T or Q.

The radicals R' are identical or different and are selected from linear or branched $C_1$–$C_6$ alkyl radicals, $C_2$–$C_4$ alkenyl radicals, phenyl radicals and 3,3,3-trifluoropropyl radicals. Examples of alkyl radicals R' which may be mentioned are methyl, ethyl, isopropyl, tert-butyl and n-hexyl radicals, and examples of alkenyl radicals R' which may be mentioned are vinyl radicals.

It must be understood that, in the POS resins H of the aforementioned type, some of the radicals R' are alkenyl radicals.

Examples which may be mentioned of branched organopolysiloxane oligomers or polymers are resins MQ, resins MDQ, resins TD and resins MDT, it being possible for the alkenyl groups to be carried by the units M, D and/or T. Examples of particularly suitable resins which may be mentioned are vinylated resins MDQ or MQ having a vinyl group content of between 0.2 and 10% by weight, these vinyl groups being carried by the units M and/or D.

This structural resin is advantageously present in a concentration of between 10 and 70% by weight, preferably of between 30 and 60% by weight and particularly preferably of between 40 and 60% by weight, based on all the constituents of the composition.

The polyaddition reaction peculiar to the crosslinking mechanism of the varnish according to the invention is well known to those skilled in the art. A catalyst can also be used in this reaction. This catalyst can be selected especially from platinum and rhodium compounds. In particular, it is possible to use the complexes of platinum and an organic product described in patents U.S. Pat. No. 3,159,601, U.S. Pat. No. 3,159,602 and U.S. Pat. No. 3,220,972 and European patents EP-A-0 057 459, EP-A-0 188 978 and EP-A-0 190 530, and the complexes of platinum and vinylated organosiloxanes described in patents U.S. Pat. No. 3,419,593, U.S. Pat. No. 3,715,334, U.S. Pat. No. 3,377,432 and U.S. Pat. No. 3,814,730. The generally preferred catalyst is platinum. In this case the amount of catalyst C, calculated as the weight of platinum metal, is generally between 2 and 400 ppm and preferably between 5 and 100 ppm, based on the total weight of the POS (A & A'), (B & B').

The inhibitors of the addition reaction, G, are selected from the following compounds:
polyorganosiloxanes which are advantageously cyclic and substituted by at least one alkenyl, tetramethylvinyltetrasiloxane being particularly preferred,
pyridine,
organic phosphines and phosphites,
unsaturated amides,
alkylated maleates,
and acetylenic alcohols.

These acetylenic alcohols (cf. FR-B-1 528 464 and FR-A-2 372 874), which are among the preferred thermal blockers of the hydrosilylation reaction, have the formula

R—(R')C(OH)—C≡CH in which:

R is a linear or branched alkyl radical or a phenyl radical;

R' is H, a linear or branched alkyl radical or a phenyl radical;

it optionally being possible for the radicals R, R' and the carbon atom in the α-position to the triple bond to form a ring;

the total number of carbon atoms present in R and R' being at least 5 and preferably 9 to 20.

Said alcohols are preferably selected from those having a boiling point above 250° C. Examples which may be mentioned are:

1-ethynylcyclohexan-1-ol;

3-methyldodec-1-yn-3-ol;

3,7,11-trimethyldodec-1-yn-3-ol;

1,1-diphenylprop-2-yn-1-ol;

3-ethyl-6-ethylnon-1-yn-3-ol;

3-methylpentadec-1-yn-3-ol.

These α-acetylenic alcohols are commercial products.

Such a retarder (I.1) is present in an amount of at most 3000 ppm and preferably in an amount of 100 to 2000 ppm, based on the total weight of the organopolysiloxanes A and B.

The adhesion promoter F can comprise e.g.:

(F.1) at least one alkoxylated organosilane of the following general formula:

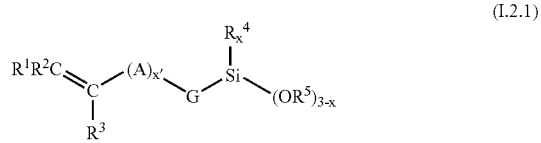

(I.2.1)

in which:

$R^1$, $R^2$, $R^3$ are hydrogenated or hydrocarbon radicals that are identical to or different from one another and are hydrogen, a linear or branched $C_1$–$C_4$ alkyl or a phenyl optionally substituted by at least one $C_1$–$C_3$ alkyl;

A is a linear or branched $C_1$–$C_4$ alkylene;

G is a valence bond;

$R^4$ and $R^5$ are identical or different radicals and are a linear or branched $C_1$–$C_4$ alkyl;

x'=0 or 1;

x=0 to 2, said compound (F.1) preferably being vinyltrimethoxysilane (VTMS) or γ-methacryloxypropyltrimethoxysilane;

(F.2) at least one organosilicon compound comprising at least one epoxy radical, said compound (F.2) preferably being 3-glycidoxypropyltrimethoxysilane (GLYMO);

(F.3) at least one chelate of a metal M and/or a metal alkoxide of the general formula $M(OJ)_n$, where n=valency of M and J=linear or branched $C_1$–$C_8$ alkyl, M being selected from the group comprising Ti, Zr, Ge, Li, Mn, Fe, Al and Mg, said compound (F.3) preferably being tert-butyl titanate.

The proportions of (F.1), (F.2) and (F.3), expressed in % by weight based on the total of the three, are preferably as follows:

(F.1)≧10, (F.2)≧10, (F.3)≦80.

Furthermore, this adhesion promoter F is preferably present in an amount of 0.1 to 10%, preferably of 0.5 to 5% and particularly preferably of 1 to 2.5% by weight, based on all the constituents of the preparation.

The particulate compound E is selected from colloidal silicas, powdered combustion silica and precipitated silica, and mixtures thereof.

These powders have a mean particle size generally of less than 0.1 μm and a BET specific surface area greater than 50 m²/g and preferably of between 100 and 300 m²/g.

These fillers can advantageously be treated with a compatibilizing agent such as hexamethyldisilazane.

It is preferable to use this component in an amount by weight of 0.001 to 5 parts and preferably of between 1 and 5 parts.

As regards the functional additives I which can be used, these can be covering products, e.g. pigments/colorants (I.1), stabilizers (I.2) or fillers (I.3).

When the preparations used in the process according to the invention comprise a filler (I.3), this is preferably a mineral filler. It can consist of products selected from siliceous (or non-siliceous) materials.

Siliceous fillers, such as diatomaceous earths or ground quartz, can thus be employed.

Furthermore, examples of non-siliceous fillers, which can be used by themselves or in a mixture, are carbon black, titanium dioxide, aluminum oxide, hydrated alumina, expanded vermiculite, zirconia, a zirconate, non-expanded vermiculite, calcium carbonate, zinc oxide, mica, talcum, iron oxide, barium sulfate and slaked lime. These fillers have a particle size generally of between 0.01 and 300 μm and a BET surface area of less than 100 m²/g.

In the process according to the invention, it is advantageously possible to use a two-component system as a precursor for the preparations.

The varnish composition according to the invention can, for example, be applied to a substrate by any appropriate impregnating means (for example padding) and optionally any appropriate coating means (for example a knife or cylinder).

The crosslinking of the liquid silicone varnish composition applied to the substrate to be coated is generally activated e.g. by heating the impregnated or coated substrate to a temperature of between 50 and 200° C., the maximum heat resistance of the substrate obviously being taken into account.

Given the ease with which it is obtained, its low cost and its anti-friction properties, the silicone varnish according to the invention is likely to have outlets in numerous fields of application and particularly in the field of the coating of substrates having a woven or non-woven fibrous core.

According to another of its features, a varnishing process is characterized in that the composition as defined above is applied, as an anti-friction varnish, to a substrate optionally coated with at least one layer of silicone elastomer.

Preferably, this process consists essentially in:

coating the substrate with the composition as defined above, crosslinking the layer of varnish, optionally with thermal activation, and optionally repeating the above steps at least once.

According to one advantageous provision of the invention, the varnish composition is applied to the substrate at a coating rate less than or equal to 25 g/m² and preferably of between 5 and 20 g/m².

The means of applying the layer of non-crosslinked varnish to the substrate are of the known type appropriate for this purpose (for example a knife, a coating cylinder or spraying). The same applies to the activating means, e.g. thermal activation or activation by IR radiation.

Further details on this aspect will be given in the Examples below.

The present invention further relates to the varnished substrate (or composite), having anti-friction properties and a slippery feel, which is obtainable by the process as mentioned above. This composite is characterized in that it comprises:

a substrate, optionally a coating firmly fixed to at least one side of the substrate and consisting of at least one layer of silicone elastomer, at least one layer of varnish based on the composition as defined above.

The silicone coating is optional because it is not essential when the substrate itself is silicone.

The substrate is preferably a flexible substrate and is preferably selected from the group comprising:

textiles, non-woven fibrous substrates, polymer films, particularly polyester, polyamide, etc.

In one advantageous embodiment, this varnished substrate—preferably a textile substrate—is coated on at least one side with at least one layer of crosslinkable or at least partially crosslinked silicone elastomer preferably selected from:

polyaddition or polycondensation RTV silicones, and/or peroxide EVC silicones, and/or polyaddition LSR silicones.

The anti-friction varnish obtained from the composition as defined above is applied to the (top) layer(s) of silicone elastomer.

The expressions RTV, LSR and EVC are well known to those skilled in the art: RTV is the abbreviation for Room Temperature Vulcanizing, LSR is the abbreviation for Liquid Silicone Rubber, and EVC is the abbreviation for Elastomère Vulcanisable à Chaud (heat vulcanizing elastomer).

In practice, the invention relates more precisely to substrates (for example textiles such as those used for the manufacture of airbags) coated on one or both sides with a layer of RTV, EVC or LSR crosslinked silicone elastomer, which itself is coated with anti-friction silicone varnish as defined above.

The problem of providing anti-friction properties is particularly acute in the case of these crosslinked silicone elastomer coatings since, as already indicated above, a characteristic of the latter is that they have a sticky feel.

Polyorganosiloxanes, which are the main constituents of the sticky layers of crosslinked elastomers to which the varnish according to the invention can be applied, can be linear, branched or crosslinked and can contain hydrocarbon radicals and/or reactive groups such as hydroxyl groups, hydrolyzable groups, alkenyl groups and hydrogen atoms. It should be pointed out that polyorganosiloxane compositions are amply described in the literature and especially in the work by Walter NOLL entitled "Chemistry and Technology of Silicones", Academic Press, 1968, 2nd edition, pages 386 to 409.

More precisely, these varnishable polyorganosiloxanes consist of siloxy units of the general formula

and/or siloxy units of the formula

in which the various symbols are defined as follows:

the symbols R°, which are identical or different, are each a non-hydrolyzable hydrocarbon group, it being possible for this radical to be:

an alkyl or halogenoalkyl radical having from 1 to 5 carbon atoms and containing from 1 to 6 chlorine and/or fluorine atoms, cycloalkyl and halogenocycloalkyl radicals having from 3 to 8 carbon atoms and containing from 1 to 4 chlorine and/or fluorine atoms, aryl, alkylaryl and halogenoaryl radicals having from 6 to 8 carbon atoms and containing from 1 to 4 chlorine and/or fluorine atoms, cyanoalkyl radicals having 3 or 4 carbon atoms;

the symbols Z°, which are identical or different, are each a hydrogen atom, a $C_2$–$C_6$ alkenyl group, a hydroxyl group, a hydrolyzable atom or a hydrolyzable group;

$n_1$=an integer equal to 0, 1, 2 or 3;

$x_1$=an integer equal to 0, 1, 2 or 3;

$y_1$=an integer equal to 0, 1 or 2;

the sum x+y is between 1 and 3.

By way of illustration, the following groups may be mentioned among the organic radicals R° directly bonded to silicon atoms: methyl; ethyl; propyl; isopropyl; butyl; isobutyl; n-pentyl; t-butyl; chloromethyl; dichloromethyl; α-chloroethyl; α,β-dichloroethyl; fluoromethyl; difluoromethyl; α,β-difluoroethyl; 3,3,3-trifluoropropyl; trifluorocyclopropyl; 4,4,4-trifluorobutyl; 3,3,4,4,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-trifluorotolyl; and xylyls such as 2,3-dimethylphenyl and 3,4-dimethylphenyl.

Preferably, the organic radicals R° bonded to silicon atoms are methyl or phenyl radicals, it optionally being possible for these radicals to be halogenated, or cyanoalkyl radicals.

The symbols Z° can be hydrogen atoms, hydrolyzable atoms such as halogen atoms, particularly chlorine atoms, vinyl groups, hydroxyl groups, or hydrolyzable groups such as amino, amido, aminoxy, oxime, alkoxy, alkenyloxy or acyloxy.

It is known that the nature of the polyorganosiloxane, i.e. the ratios between the siloxy units (I') and (II') and their distribution, is chosen according to the crosslinking treatment which is to be performed on the curable (or vulcanizable) composition in order to convert it to elastomer.

It is possible to use a wide variety of one-component or two-component compositions that crosslink by means of polyaddition or polycondensation reactions in the presence of a metal catalyst and optionally in the presence of an amine and a crosslinking agent.

Two-component or one-component polyorganosiloxane compositions that crosslink at room temperature (RTV) or under the action of heat (EVC) by means of polyaddition reactions, essentially by the reaction of hydrogenosilyl groups with alkenylsilyl groups, generally in the presence of a metal catalyst preferably based on platinum, are described e.g. in patents U.S. Pat. Nos. 3,220,972, 3,284,406, 3,436,366, 3,697,473 and 4,340,709. The polyorganosiloxanes forming part of these compositions generally consist of pairs based on the one hand on a linear, branched or crosslinked polysiloxane made up of units (II) in which the radical $Z°$ is a $C_2$–$C_6$ alkenyl group and $x_1$ is equal to at least 1, optionally in association with units (I'), and on the other hand on a linear, branched or crosslinked hydrogenopolysiloxane made up of units (II') in which the radical $Z°$ this time is a hydrogen atom and $x_1$ is equal to at least 1, optionally in association with units (I').

Two-component or one-component polyorganosiloxane compositions that crosslink at room temperature (RTV) by means of polycondensation reactions under the action of moisture, generally in the presence of a metal catalyst, e.g. a tin compound, are described e.g. in the case of one-component compositions in patents U.S. Pat. Nos. 3,065,194, 3,542,901, 3,779,986 and 4,417,042 and in patent FR-A-2 638 752, and in the case of two-component compositions in patents U.S. Pat. Nos. 3,678,002, 3,888,815, 3,933,729 and 4,064,096. The polyorganosiloxanes forming part of these compositions are generally linear, branched or crosslinked polysiloxanes consisting of units (II') in which the radical $Z°$ is a hydroxyl group or a hydrolyzable atom or group and $x_1$ is equal to at least 1, with the possibility of having at least one radical $Z°$ which is a hydroxyl group or a hydrolyzable atom or group and at least one radical $Z°$ which is an alkenyl group when $x_1$ is equal to 2 or 3, said units (II') optionally being associated with units (I'). Such compositions can also contain a crosslinking agent, which is especially a silane carrying at least three hydrolyzable groups, for example a silicate, an alkyltrialkoxysilane or an aminoalkyltrialkoxysilane.

These RTV polyorganosiloxane compositions that crosslink by means of polyaddition or polycondensation reactions advantageously have a viscosity at 25° C. of at most 100,000 mPa.s and preferably of between 10 and 50,000 mPa.s.

It is possible to use RTV compositions that crosslink at room temperature by means of polyaddition or polycondensation reactions and have a viscosity at 25° C. greater than 100,000 mPa.s, such as a viscosity ranging from a value above 100,000 mPa.s to 300,000 mPa.s; this modality is recommended when it is desired to prepare filled curable compositions in which the filler(s) used has (have) a tendency to separate out by sedimentation.

It is also possible to use compositions that crosslink under the action of heat by means of polyaddition reactions, and more precisely compositions of the so-called polyaddition EVC type, which have a viscosity at 25° C. of at least 500,000 mPa.s and preferably of between 1 million mPa.s and 10 million mPa.s or even more.

It is also possible to use compositions that cure at high temperature under the action of organic peroxides such as 2,4-dichlorobenzoyl peroxide, benzoyl peroxide, t-butyl perbenzoate, cumyl peroxide or di-t-butyl peroxide. The polyorganosiloxane or gum forming part of such compositions (simply known as EVC type) then consists essentially of siloxy units (I'), optionally in association with units (II') in which the radical $Z°$ is a $C_2$–$C_6$ alkenyl group and x is equal to 1. Such EVC are described e.g. in patents U.S. Pat. Nos. 3,142,655, 3,821,140, 3,836,489 and 3,839,266. These compositions advantageously have a viscosity at 25° C. of at least 1 million mPa.s and preferably of between 2 million and 10 million mPa.s or even more.

Other polyorganosiloxane compositions that can be varnished with the silicone varnish composition according to the invention are one-component or two-component polyorganosiloxane compositions that crosslink under the action of heat by means of polyaddition reactions, which are called LSR compositions. These correspond to the definitions given above in respect of the preferred compositions called RTV, except that their viscosity now ranges from a value above 100,000 mPa.s to 500,000 mPa.s.

Without implying a limitation, the silicone elastomer coatings to which the varnish according to the invention can be applied in order to reduce their coefficient of friction are more especially coatings obtained from silicone elastomer compositions that vulcanize in the cold (RTV), particularly of the two-component type (RTV 2), by polyaddition.

Apart from silicone-coated textile substrates, the anti-friction varnish according to the invention can be applied to:
  plastic films (e.g. made of polyester) used as heat transfer ribbons for heat transfer printers,
  or plastic films for protective packaging (e.g. made of polyethylene or polypropylene).

In all applications, the anti-friction varnish according to the invention will promote sliding on at least one side of the plastic film, it being possible for said side to be coated with at least one silicone layer.

Finally, the present invention relates to any manufactured article containing composite as defined above.

The Examples given demonstrate the performance of the varnish according to the invention and its advantages compared with the prior art.

EXAMPLES

I/Preparation of the Composites

A 200 g/m² polyester fabric is first coated with a layer of silicone elastomer obtained as described below.

40 kg of an α,ω-divinylated silicone oil of viscosity 1.5 Pa.s, containing 0.1 meq of vinyl (Vi) per gram of oil, 0.24 kg of drinking water and 0.24 kg of hexamethyldisilazane are introduced into a 100 l mixer with a stirring arm. After homogenization, 13.9 kg of a combustion silica characterized by its specific surface area of 200 m²/g are added in portions over approximately 2 hours. After about 1 hour of mixing, 2.27 kg of hexamethyldisilazane are added over approximately 1 hour. 2 hours later, a heating phase is started during which the mixture is placed under a stream of nitrogen (30 m³/h); heating is continued until the temperature reaches about 140° C., this temperature plateau being maintained for 2 hours in order to drive the volatile substances out of the composition. The suspension is then left to cool.

This suspension is used to formulate a part A and a part B in appropriate reactors.

Part A contains:
  320 g of the suspension,
  111 g of an α,ω-divinylated oil of viscosity 100 Pa.s, containing 0.03 meq of Vi per gram of oil,
  35 g of ground quartz with a mean particle size (d50) of around 2.5 µm,
  12 g of a polyhydrogeno oil of viscosity 0.3 Pa.s, containing 1.6 meq of SiH per gram of oil,
  12 g of an α,ω-dihydrogeno oil containing 1.9 meq of SiH per gram of oil,
  5 g of γ-methacryloxypropyltrimethoxysilane, 5 g of γ-glycidoxypropyltrimethoxysilane,
0.7 g of ethynylcyclohexanol.
Part B contains:
480 g of the suspension,
20 g of butyl orthotitanate,
1.1 g of a catalyst of g containing 10% of platinum.

The parts A and B are mixed in a ratio of 100 to 10 and, after the removal of bubbles, are used to coat the above-mentioned textile substrate. This coating is then thermally crosslinked.

A varnish is then deposited by means of a Meyer bar; under these conditions the amount deposited is in the order of 15–20 g/m². The whole is then placed in an oven to dry and crosslink the varnish.

II/Measurement of the Coefficient of Sliding Friction

The composite is placed on a glass plate; it is loaded with a parallelepipedal mass with a surface area of 40 cm² and a weight m of 200 g. The force F necessary to displace this set-up is then measured at a speed of displacement of 150 mm/min.

The coefficient of non-dimensional friction is expressed as the ratio of this force to the weight applied.

$K=F/mg$

This measurement is complemented with the sensation experienced on touching the composite.

III/Visual Appearance

It is noted whether the varnish imparts a shiny or matt appearance.

IV/Resistance to Soiling

Carbon black is deposited on the varnish coating and the ease with which this substrate can be cleaned is noted on a scale of 0 to 5:
0=remains black; 5=a few traces of black persist Comparative Example 1

Varnish 1
The following are mixed gradually in the indicated proportions (parts by weight) in a reactor at room temperature:
38.5 parts of α,ω-diMeVi-polydimethylsiloxane (PDMS) of viscosity 20 mPa.s,
22.5 parts of PDMS containing about 2.5% of Vi in the form of groups $D^{Vi}$,
39 parts of talcum,
13 parts of polymethylhydrogenosiloxane of viscosity 20 mPa.s,
0.052 part of ethynylcyclohexanol,
0.05 part of platinum catalyst of g,
100 parts of toluene.

Comparative Example 2

Varnish 2
The following are mixed gradually in the indicated proportions (parts by weight) in a reactor at room temperature:
85 parts of PDMS containing about 2.5% of Vi in the form of groups $D^{Vi}$,
15 parts of α,ω-diMeVi PDMS of viscosity 600 mPa.s,
20 parts of α,ω-diMeVi PDMS of viscosity 100 Pa.s,
0.052 part of ethynylcyclohexanol,
10 parts of γ-methacryloxypropyltrimethoxysilane,
15 parts of polymethylhydrogenosiloxane of viscosity 20 mPa.s;
0.1 part of platinum catalyst of g.

Example 3

Varnish 3
The following is added to the formulation of varnish 2:
5 parts of Orgasol® 2002 ES3 (PA 12 powder of mean diameter 30 μm).

Example 4

Varnish 4
The following is added to the formulation of varnish 3:
1.5 parts of R812 silica from DEGUSSA (hydrophobized Aerosil® silica of 260 m²/g).

Results

TABLE 1

|  | Appearance | K | Feel | Soiling |
|---|---|---|---|---|
| Not varnished |  | >10 |  | 0 |
| Comparative Example 1 Varnish 1 | matt | 0.5 | soft | 1 |
| Comparative Example 2 Varnish 2 | shiny | >8 | sticky | 3 |
| Example 3 Varnish 3 | dull-glazed | 0.45 | slippery | 5 |
| Example 4 Varnish 4 | dull-glazed | 0.35 | slippery, soft | 5 |

Comments

The results presented show that:
the coefficient of friction is very greatly reduced by varnishing,
the coefficient of friction is further improved by the presence of fillers,
the feel is more slippery in correlation with the coefficient of friction,
a shiny appearance is preserved when Orgasol® is used,
the resistance to soiling is much better in the case of varnishes 2 to 4.

Apart from its impact on the surface slip or the reflectivity, the presence of silica offers an additional stabilization of the suspensions in respect of decantation phenomena; it also allows a certain regulation of the viscosity of the varnish formulation.

The invention claimed is:

1. A crosslinkable silicone composition useful especially as a varnish which has anti-friction properties, said composition comprising at least two organosilicon species A and B which react with one another in the presence of a catalyst C to allow crosslinking, at least one of these two species comprising a polyorganosiloxane (POS), and at least one particulate component D, wherein:
this composition is crosslinkable by polyaddition;
the particulate component D is selected from the group consisting of powdered (co)polyamides defined as follows:
the particles are of substantially rounded shape, and the mean particle diameter $\Phi_{md}$ is between 0.1 and 200 μm;
it also contains at least one other particulate component E selected from the group consisting of powdered silicas having a mean particle diameter $\Phi_{md}$ of about 0.1 μm or less, and a BET specific surface area greater than 50 m²/g.

2. The composition according to claim 1, wherein the particulate component D is present in an amount of 0.1 to 20% w/w, based on the total weight of the composition.

3. The composition according to claim 1, wherein the particulate component E is present in an amount of 0.001 to 5% w/w, based on the total weight of the composition.

4. The composition according to claim 1, wherein it comprises:
(A) 100 parts by weight of at least one polyorganosiloxane (POS) having at least two alkenyl groups bonded to the silicon in each molecule;
(B) 1 to 50 parts by weight of at least one polyorganosiloxane having at least three hydrogen atoms bonded to the silicon in each molecule;
(C) 0.001 to 1 part by weight of at least one catalyst;
(D) 0.1 to 20 parts by weight of at least one particulate component consisting of (co)polyamide;
(E) 0.001 to 5 parts by weight of at least one siliceous particulate component;
(F) 0 to 30 parts by weight of at least one adhesion promoter;
(G) 0 to 1 part by weight of at least one crosslinking inhibitor;
(H) 0 to 10 parts by weight of at least one polyorganosiloxane resin;
(I) optionally at least one functional additive for imparting specific properties.

5. The composition according to claim 4, wherein the dynamic viscosity η (mPa.s at 25° C.) of its silicone phase, consisting of the POS A and B and optionally the components H or I, is such that:

$$200 \leq \eta \leq 3000.$$

6. The composition according to claim 4, wherein one or more POS A and the optional resins H have siloxy units of the formula $$W_a Z_b SiO_{(4-(a+b))/2} \quad (1)$$

in which:
the symbols W, which are identical or different, are each an alkenyl group;
the symbols Z, which are identical or different, are each a non-hydrolyzable monovalent hydrocarbon group that is devoid of an unfavorable action on the activity of the catalyst, is optionally halogenated;
a is 1 or 2, b is 0, 1 or 2 and a+b is between 1 and 3;
optionally at least some of the other units are units of the empirical formula $$Z_c SiO_{(4-c)/2} \quad (2)$$

in which Z is as defined above and c has a value of between 0 and. 3.

7. The composition according to claim 1, wherein one or more POS B have siloxy units of the formula $$H_d L_e SiO_{(4-(d+e))/2} \quad (3)$$

in which:
the symbols L, which are identical or different, are each a non-hydrolyzable monovalent hydrocarbon group that is devoid of an unfavorable action on the activity of the catalyst, is optionally halogenated;
d is 1 or 2, e is 0, 1 or 2 and d+e has a value of between 1 and 3;
optionally at least some of the other units being units of the empirical formula $$L_g SiO_{(4-g)/2} \quad (4)$$

in which L is as defined above and g has a value of between 0 and 3.

8. The composition according to claim 6, wherein the alkenyl groups W of the POS A and the optional POS resins H are vinyl groups Vi carried by siloxy units D and optionally M and/or T.

9. A varnishing process, in which the composition according to claim 1 is applied, as an anti-friction varnish, to a substrate optionally coated with at least one layer of silicone elastomer.

10. A process comprising:
coating a substrate with the composition according to claim 1,
crosslinking the layer of varnish, optionally with thermal activation,
and optionally repeating the above steps at least once.

11. The process according to claim 9, wherein the varnish composition is applied to the substrate at a coating rate less than or equal to 25 g/m².

12. A composite obtained by the process according to claim 9, comprising:
a substrate,
optionally a coating firmly fixed to at least one side of the substrate and comprising at least one layer of silicone elastomer,
at least one layer of varnish based on the composition comprising at least two organosilicon species A and B which react with one another in the presence of a catalyst C to allow crosslinking, at least one of these two species comprising a polyorganosiloxane (POS), and at least one particulate component D, wherein:
this composition is crosslinkable by polyaddition;
the particulate component D is selected from the group consisting of powdered (co)polyamides defined as follows:
the particles are of substantially rounded shape, and
the mean particle diameter $\Phi_{md}$ is between 0.1 and 200 μm;
it also contains at least one other particulate component E selected from the group consisting of powdered silicas having a mean particle diameter $\Phi_{md}$ of about 0.1 μm or less, and a BET specific surface area greater than 50 m²/g.

13. The composite according to claim 12, wherein the substrate is a flexible substrate.

14. A manufactured article, containing the composite according to claim 12.

15. The composition according to claim 1, wherein the mean particle diameter $\Phi_{md}$ of the particulate component D is between 5 and 100 um.

16. The composition according to claim 5, wherein the dynamic viscosity η (mPa.s at 25° C.) of its silicone phase, consisting of the POS A and B and optionally the components H or I, is such that:

$$300 \leq \eta \leq 2000.$$

17. The composition according to claim 4, wherein the catalyst is composed of at least one metal belonging to the platinum group.

18. The composite according to claim 13, wherein said substrate is selected from the group consisting of textiles, non-woven fibrous substrates, polyester films and polyamide films.

* * * * *